(12) United States Patent
Besling et al.

(10) Patent No.: US 6,363,348 B1
(45) Date of Patent: Mar. 26, 2002

(54) USER MODEL-IMPROVEMENT-DATA-DRIVEN SELECTION AND UPDATE OF USER-ORIENTED RECOGNITION MODEL OF A GIVEN TYPE FOR WORD RECOGNITION AT NETWORK SERVER

(75) Inventors: Stefan Besling; Eric Thelen, both of Aachen (DE)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 09/174,167

(22) Filed: Oct. 16, 1998

(30) Foreign Application Priority Data

Oct. 20, 1997 (EP) .............................................. 97203267

(51) Int. Cl.$^7$ .............................................. G10L 15/00
(52) U.S. Cl. ..................... 704/270.1; 704/251
(58) Field of Search ................................ 704/251, 275, 704/270.1

(56) References Cited

U.S. PATENT DOCUMENTS

| 4,773,093 A | 9/1988 | Higgins et al. |
| 4,922,538 A | 5/1990 | Tchorzewski |
| 5,165,095 A | * 11/1992 | Borcherding ............ 379/88.03 |

FOREIGN PATENT DOCUMENTS

| WO | WO9822936 | 5/1998 | ............. G10L/5/06 |

OTHER PUBLICATIONS

F. Class, et al. "Fast speaker adaptation for speech recognition systems," Proc. IEEE ICASSP 90, vol. 1, p. 133–136, Apr. 1990.*

Xeudong Huang, et al. "On Speaker–Independent, Speaker–Dependent, and Speaker–Adaptive Speech Recognition", IEEE Trans. Speech and Audio Processing, vol. 1, No. 1, p. 150–157, Apr. 1993.*

* cited by examiner

Primary Examiner—Tālivaldis Ivars Šmits
(74) Attorney, Agent, or Firm—Daniel J. Piotrowski (57) ABSTRACT

A distributed pattern recognition system includes at least one user station and a server station. The server station and the user station are connected via a network, such as Internet. The server station includes different recognition models of a same type. As part of a recognition enrolment, the user station transfers model improvement data associated with a user of the user station to the server station. The server station selects a recognition model from the different recognition models of a same type in dependence on the model improvement data. For each recognition session, the user station transfers an input pattern representative of time sequential input generated by the user to the server station. The server station retrieves a recognition model selected for the user and provides the retrieved recognition model to a recognition unit for recognising the input pattern using the recognition models.

11 Claims, 3 Drawing Sheets

FIG. 4

USER MODEL-IMPROVEMENT-DATA-DRIVEN SELECTION AND UPDATE OF USER-ORIENTED RECOGNITION MODEL OF A GIVEN TYPE FOR WORD RECOGNITION AT NETWORK SERVER

BACKGROUND OF THE INVENTION

The invention relates to a method for recognizing an input pattern stored in a user station using a recognition unit of a server station; the server station and the user station being connected via a network; the recognition unit being operative to recognize the input pattern using a model collection of at least one recognition model; the method comprising:

performing an initial recognition enrolment step, comprising transferring model improvement data associated with a user of the user station from the user station to the recognition unit; and associating the user of the user station with a user identifier; and for a recognition session between the user station and the server station, transferring a user identifier associated with a user of the user station and an input pattern representative of time sequential input generated by the user from the user station to the server station; and using the recognition unit to recognize the input pattern by incorporating at least one recognition model in the model collection which reflects the model improvement data associated with the user.

The invention further relates to a pattern recognition system comprising at least one user station storing an input pattern and a server station comprising a recognition unit; the recognition unit being operative to recognize the input pattern using a model collection of at least one recognition model; the server station being connected to the user station via a network;

the user station comprising means for initially transferring model improvement data associated with a user of the user station and a user identifier associated with the user to the server station; and for each recognition session between the user station and the server station transferring a user identifier associated with a user of the user station and an input pattern representative of time sequential input generated by the user to the server station; and the server station comprising means for, for each recognition session between the user station and the server station, incorporating at least one recognition model in the model collection which reflects the model improvement data associated with a user from which the input pattern originated; and using the speech recognition unit to recognize the input pattern received from the user station.

Figure 1:
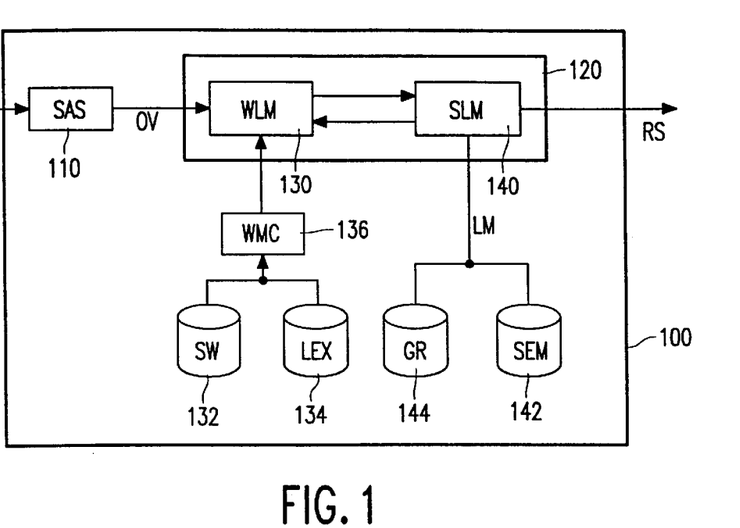
FIG. 1 illustrates a speech recognition system.

Pattern recognition systems, such as large vocabulary continuous speech recognition systems or handwriting recognition systems, typically use a collection of recognition models to recognize an input pattern. For instance, an acoustic model and a vocabulary may be used to recognize words and a language model may be used to improve the basic recognition result. FIG. 1 illustrates a typical structure of a large vocabulary continuous speech recognition system 100 [refer L. Rabiner, B-H. Juang, "Fundamentals of speech recognition", Prentice Hall 1993, pages 434 to 454]. The system 100 comprises a spectral analysis subsystem 110 and a unit matching subsystem. In the spectral analysis subsystem 110 the speech input signal (SIS) is spectrally and/or temporally analysed to calculate a representative vector of features (observation vector, OV). Typically, the speech signal is digitised (e.g. sampled at a rate of 6.67 kHz.) and pre-processed, for instance by applying pre-emphasis. Consecutive samples are grouped (blocked) into frames, corresponding to, for instance, 32 msec. of speech signal. Successive frames partially overlap, for instance, 16 msec. Often the Linear Predictive Coding (LPC) spectral analysis method is used to calculate for each frame a representative vector of features (observation vector). The feature vector may, for instance, have 24, 32 or 63 components. The standard approach to large vocabulary continuous speech recognition is to assume a probabilistic model of speech production, whereby a specified word sequence $W=w_1w_2w_3 \ldots w_q$ produces a sequence of acoustic observation vectors $Y=y_1y_2y_3 \ldots y_T$. The recognition error can be statistically minimised by determining the sequence of words $w_1w_2w_3 \ldots w_q$ which most probably caused the observed sequence of observation vectors $y_1y_2y_3 \ldots y_T$ (over time t=1, ..., T), where the observation vectors are the outcome of the spectral analysis subsystem 110.

This results in determining the maximum a posteriori probability:

max $P(W|Y)$, for all possible word sequences W By applying Bayes' theorem on conditional probabilities, $P(W|Y)$ is given by:

$P(W|Y)=P(Y|W).P(W)/P(Y)$

Since $P(Y)$ is independent of W, the most probable word sequence is given by:

arg max $P(Y|W).P(W)$ for all possible word sequences W(1)

Figure 2A:
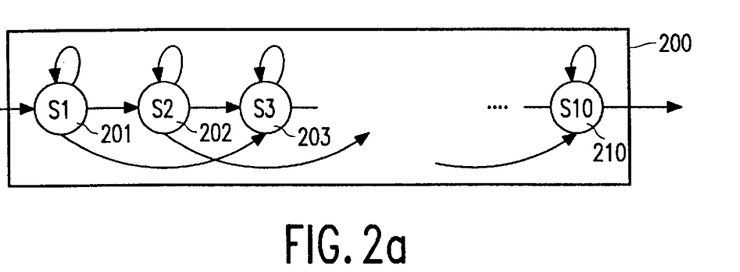
FIG. 2 shows Hidden Markov Models for modelling word or sub-word units.
Figure 2B:
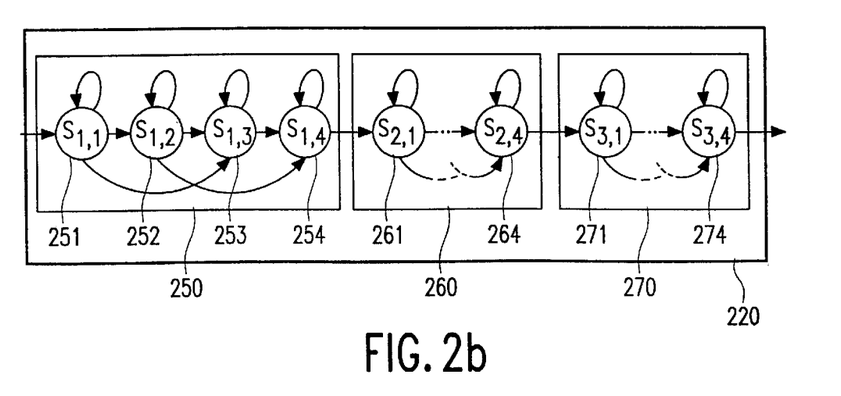

In the unit matching subsystem 120, an acoustic model provides the first term of equation (1). The acoustic model is used to estimate the probability $P(Y|W)$ of a sequence of observation vectors Y for a given word string W. For a large vocabulary system, this is usually performed by matching the observation vectors against an inventory of speech recognition units. A speech recognition unit is represented by a sequence of acoustic references. Various forms of speech recognition units may be used. As an example, a whole word or even a group of words may be represented by one speech recognition unit. A word model (WM) provides for each word of a given vocabulary a transcription in a sequence of acoustic references. For systems, wherein a whole word is represented by a speech recognition unit, a direct relationship exists between the word model and the speech recognition unit. Other systems, in particular large vocabulary systems, may use for the speech recognition unit linguistically based sub-word units, such as phones, diphones or syllables, as well as derivative units, such as fenenes and fenones. For such systems, a word model is given by a lexicon 134, describing the sequence of sub-word units relating to a word of the vocabulary, and the sub-word models 132, describing sequences of acoustic references of the involved speech recognition unit. A word model composer 136 composes the word model based on the sub-word model 132 and the lexicon 134. FIG. 2A illustrates a word model 200 for a system based on whole-word speech recognition units, where the speech recognition unit of the shown word is modelled using a sequence of ten acoustic references (201 to 210). FIG. 2B illustrates a word model 220 for a system based on sub-word units, where the shown word is modelled by a sequence of three sub-word models (250, 260 and 270), each with a sequence of four acoustic references (251, 252, 253, 254; 261 to 264; 271 to 274). The word models shown in FIG. 2 are based on Hidden Markov Models (HMMs), which are widely used to stochastically model speech and handwriting signals. Using this model, each recognition unit (word model or subword model) is typically characterised by an HMM, whose parameters are estimated from a training set of data. For large vocabulary speech recognition systems involving, for instance, 10,000 to 60,000 words, usually a limited set of, for instance 40, sub-word units is used, since it would require a lot of training data to adequately train an HMM for larger units. An HMM state corresponds to an acoustic reference (for speech recognition) or an allographic reference (for handwriting recognition). Various techniques are known for modelling a reference, including discrete or continuous probability densities.

A word level matching system 130 matches the observation vectors against all sequences of speech recognition units and provides the likelihoods of a match between the vector and a sequence. If sub-word units are used, constraints are placed on the matching by using the lexicon 134 to limit the possible sequence of sub-word units to sequences in the lexicon 134. This reduces the outcome to possible sequences of words. A sentence level matching system 140 uses a language model (LM) to place further constraints on the matching so that the paths investigated are those corresponding to word sequences which are proper sequences as specified by the language model. As such the language model provides the second term P(W) of equation (1). Combining the results of the acoustic model with the language model, results in an outcome of the unit matching subsystem 120 which is a recognized sentence (RS). The language model used in pattern recognition may include syntactical and/or semantical constraints 142 of the language and the recognition task. A language model based on syntactical constraints is usually referred to as a grammar 144. The grammar 144 used by the language model provides the probability of a word sequence $W=w_1 w_2 w_3 \ldots w_q$, which in principle is given by:

$$P(W)=P(w_1)P(w_2|w_1).P(w_3|w_1 w_2) \ldots P(w_q|w_1 w_2 w_3 \ldots w_q).$$

Since in practice it is infeasible to reliably estimate the conditional word probabilities for all words and all sequence lengths in a given language, N-gram word models are widely used. In an N-gram model, the term $P(w_j|w_1 w_2 w_3 \ldots w_{j-1})$ is approximated by $P(w_j|w_{j-N+1} \ldots w_{j-1})$. In practice, bigrams or trigrams are used. In a trigram, the term $P(w_j|w_1 w_2 w_3 \ldots w_{j-1})$ is approximated by $P(w_j|w_{j-2} w_{j-1})$.

Similar systems are known for recognising handwriting. The language model used for a handwriting recognition system may in addition to or as an alternative to specifying word sequences specify character sequences.

User independent pattern recognition systems are provided with user independent recognition models. In order to achieve an acceptable level of recognition, particularly large vocabulary recognition systems are made user dependent by training the system for a specific user. An example of such a system is the Philips SP 6000 dictation system. This system is a distributed system, wherein a user can dictate directly to a user station, such as a personal computer or workstation. The speech is recorded digitally and transferred to a server station via a network, where the speech is recognized by a speech recognition unit. The recognized text can be returned to the user station. In this system the acoustic references of the acoustic model are trained for a new user of the system by the new user dictating a predetermined text, with an approximate duration of 30 minutes. This provides sufficient data to the server station to enable building an entirely new set of acoustic references for the user. After this enrolment phase, the user may dictate text. For each dictation session, the recognition unit in the server station retrieves the acoustic references associated with the dictating user and uses these to recognize the dictation. Other recognition models, such as a lexicon, vocabulary, language model are not trained to a specific user. For these aspect, the system is targeted towards only one specific category of users, such as legal practitioners, physicians, surgeons, etc.

The relatively long duration of training hinders acceptance of the system by users which would like to use the system occasionally or for a short time. Moreover, the relatively large amount of acoustic references which needs to be stored by the server station for each user makes the system less suitable for large numbers of users. Using the system for dictating a text in a different field than aimed at by the language model and vocabulary could result in a degraded recognition result.

SUMMARY OF THE INVENTION

It is an object of the invention to enable pattern recognition in a client-server configuration, without an undue training burden on a user. It is a further object of the invention to enable pattern recognition in a client-server configuration, where the server is capable of simultaneously supporting recognition for many clients (user stations). It is a further object to enable pattern recognition for a wide range of subjects.

To achieve the object, the method according to the invention is characterised in that the server comprises a plurality of different recognition models of a same type; in that the recognition enrolment step comprises selecting a recognition model from the plurality of different recognition models of a same type in dependence on the model improvement data associated with the user; and storing an indication of the selected recognition model in association with the user identifier; and in that the step of recognising the input pattern comprises retrieving a recognition model associated with the user identifier transferred to the server station and incorporating the retrieved recognition model in the model collection.

By storing a number of recognition models of a same type, e.g. a number of language models each targeted towards at least one different subject, such as photography, gardening, cars, etc., a suitable recognition model can be selected for a specific user of the system. This allows good quality recognition. In this way, a user is not bound to one specific type of recognition model, such as a specific language model or vocabulary, whereas at the same time the flexibility of the system is achieved by re-using models for many users. For instance, all users which have expressed an interest in photography can use the same language model which covers photography. As such this flexibility and the associated good recognition result provided by using a user-oriented recognition model is achieved without storing a specific model for each user.

Advantageously, also the amount of training data which needs to be supplied by the user can be substantially smaller than in the known system. Instead of requiring a sufficient amount of data to fully train a model or to adapt an already existing model, according to the invention the amount of data needs only to be sufficient to select a suitable model from the available models.

The plurality of recognition models of a same type is formed by a basic recognition model and a plurality of adaptation profiles. A recognition model is selected by choosing an appropriate adaptation profile and adapting the basic model using the chosen adaptation profile. For instance, a basic language model may cover all frequently used word sequences of a language, whereas the adaptation profile covers word sequences for a specific area of interest. The adapted language model may then cover both the commonly used and the specific sequences. In this way it is sufficient to store only one basic model (of a given type) and a number of, usually much smaller, adaptation profiles.

The model improvement data comprises acoustic training data, such as acoustic references. Based on the acoustic training data a suitable acoustic model is selected or a basic acoustic model is adapted using a suitable adaptation profile. A simple way of achieving this is to recognize a relatively short utterance of a user (e.g. limited to a few sentences) with a range of different acoustic models. Each of the models is, preferably, targeted towards a specific type of speech, such as female/male speech, slow speech/fast speech, or speech with different accents. The acoustic model which gave the best result is then selected.

The acoustic model adaptation profile comprises a matrix for transforming an acoustic references space or a set of acoustic references to be combined with acoustic references used by the basic acoustic model. In this way the acoustic model can be adapted in an effective way.

The model improvement data comprises language model training data. In a preferred embodiment, the language model training data comprises at least one context identifier. Preferably, the context identifier comprises or indicates a keyword. Based on the training data, a language model or language model adaptation profile is selected.

The model improvement data comprises vocabulary training data, such as a context identifier, allowing selection of a corresponding vocabulary or vocabulary adaptation profile used for adapting a basic vocabulary.

The context identifier comprises or indicates a sequence of words, such as a phrase or a text. At least one keyword is extracted from the sequence of words and the selection of the model or adaptation profile is based on the extracted keyword(s).

To achieve the object, the pattern recognition system is characterised in that the server station comprises a plurality of different recognition models of a same type; means for selecting a recognition model from the plurality of different recognition models of a same type in dependence on the model improvement data associated with the user; and for storing an indication of the selected recognition model in association with the user identifier; and means for retrieving a recognition model associated with the user identifier transferred to the server station and for incorporating the retrieved recognition model in the model collection.

These and other aspects of the invention will be apparent from and elucidated with reference to the embodiments shown in the drawings.

DESCRIPTION OF THE PREFERRED EMBODIMENTS

Figure 3:
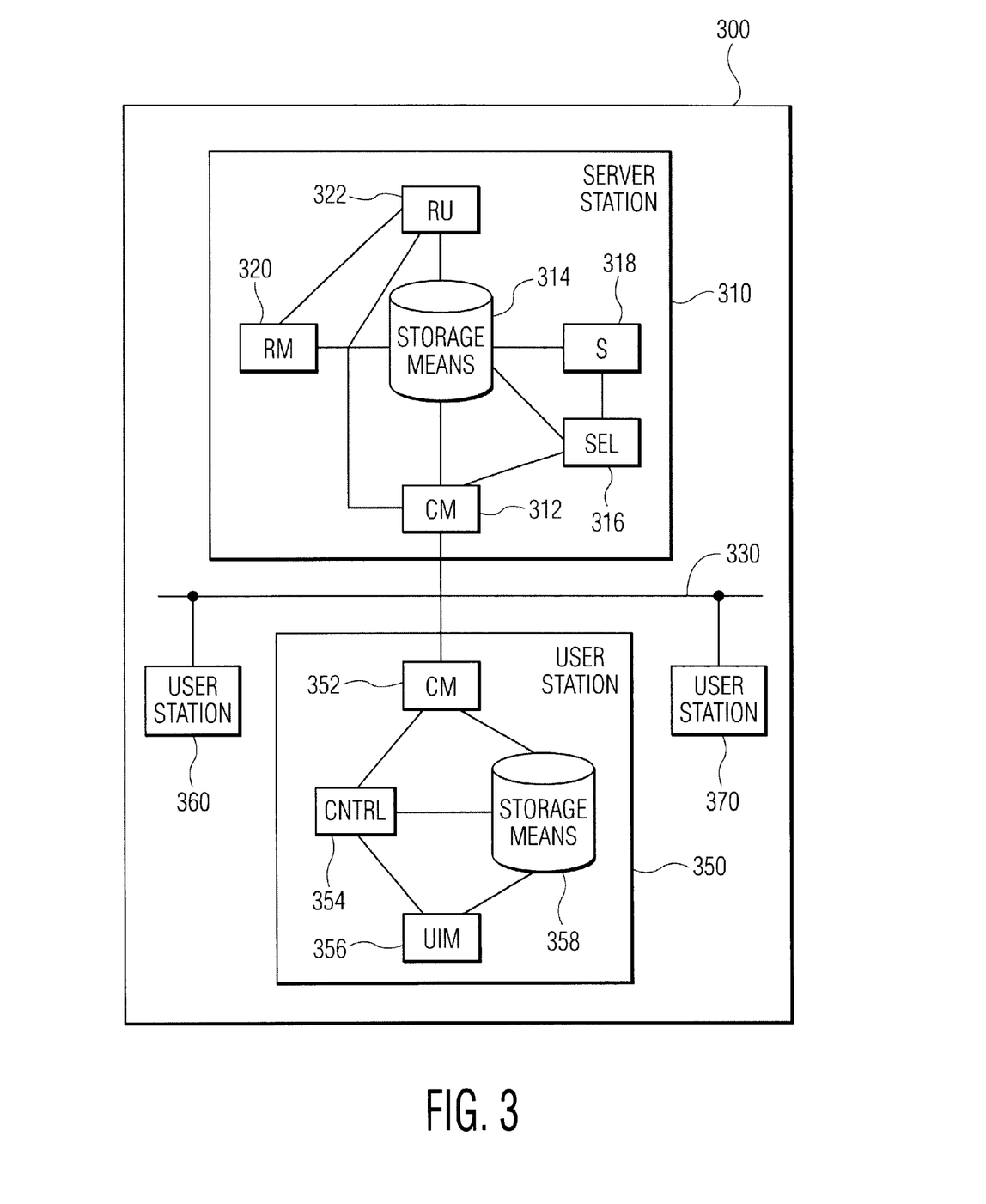
FIG. 3 illustrates a block diagram of the system according to the invention.

FIG. 3 illustrates a block diagram of a pattern recognition system 300 according to the invention. The system 300 comprises a server station 310 and at least one user station. Shown are three user stations 350, 360 and 370, where further details are only shown for user station 350. The stations may be implemented using conventional computer technology. For instance, the user station 350 may be formed by a desk-top personal computer or workstation, whereas the server station 310 may be formed by a PC server or workstation server. The computers are operated under control of a suitable program loaded in the processor of the computer. The server station 310 and the user stations 350 are connected via a network 330. The network 330 may be any suitable network, such as a local area network, for instance in an office environment, or a wide area network, preferably Internet. The stations comprise communication means 312 and 352, respectively, for communicating via the network 330. Any communication means suitable for use in combination with the network 330 may be used. Typically, the communication means are formed by a combination of hardware, such as a communication interface or a modem, and software in the form of a software driver supporting a specific communication protocol, such as Internet's TCP/IP protocols.

The user station 350 comprises control means 354. As part of an enrolment phase, the control means 354 is operative to initially transfer model improvement data from the user station 350 to the server station 310. The model improvement data is associated with a user of the user station 350. Normally, the model improvement data is directly entered by a user which at that moment uses the user station 350. The input typically occurs via user interface means 356, such as a keyboard, mouse, or via a microphone connected to an audio input interface of the user station 350. As part of the enrolment phase the control means 354 transfers a user identifier associated with the user of the user station 350 to the server station 310. The user identifier may, for instance, be a user name under which the user has logged into the user station 350 or via the user station 350 has logged into the server station 310. The user identifier may also be formed using a communication identification, such as a communication address or a telephone number.

The server station 310 comprises a storage means 314 for storing a plurality of different recognition models of a same type. The server station 310 may, for instance, store several language models, several vocabularies, or several sets of acoustic references (for a speech recognition system). The storage means 314 may be formed by a hard disk. Also any other suitable storage means may be used. The storage means 314 may be physically located in the server station 310, or alternatively be accessible by the server station 310, for instance via a network. The server station 310 further comprises selection means 316 for selecting a recognition model from the plurality of different recognition models of a same type. The selection is performed in dependence on the model improvement data associated with the user. Storing means 318 are used for storing an indication of the selected recognition model in association with the user identifier. Such a storing may be performed by storing in the storage means 314 for the selected model a list of user identifiers. Also separate tables may be used for storing the relationship between a user identifier and a selected model.

The control means 354 of the user station 350 is operative to, for each recognition session between the user station and the server station, transfer a user identifier associated with a user of the user station and an input pattern representative of time sequential input generated by the user to the server station. The recognition session may immediately follow the enrolment phase (in which case the user identifier does not need to be transferred again) or may take place at any moment following the enrolment phase. The input pattern represents language representative signals created by the user of the user station. An example of such signals are speech signals or handwriting signals. In principle, the pattern is a time-sequential pattern. Preferably any information with respect to the time sequential behaviour of the pattern is also transferred from the user station 350 to the server station 310. Preferably, a 'real-time' connection is established between the user station 350 and the server station 310, wherein the user interface means 356 of the user station 350 samples an input signal generated by the user. The signal is analysed (for instance, for speech signals in a manner similar to has been described for the spectral analysis subsystem 110 of FIG. 1) and the outcome (e.g. a sequence of vectors) are grouped into data blocks and the data blocks are transferred to the server station 310. Alternatively, the sequence of samples or the sequence of vectors may have been pre-recorded and supplied to the user station 350 from a fixed storage medium, such as a hard disk or a portable storage medium, such as a floppy disk. Normally, the time sequential information will still be present. It will be appreciated that, particularly, handwriting may also be supplied to the user station 350 as an image, wherein a detailed time sequential behaviour, which is present in an on-line handwriting recognition system, is lost. Nevertheless, such signals may also be used in the system according to the invention.

For each recognition session with a user station, the server station 310 uses retrieving means 320 for retrieving a recognition model from the storage means 314. The recognition model (or models) is retrieved which is associated with the user identifier transferred to the server station by the user station. The retrieving means 310 incorporates the retrieved recognition model in a model collection of at least one recognition model. The model collection is used by a recognition unit 322 to recognize the input pattern received from the user station 350.

Figure 4:
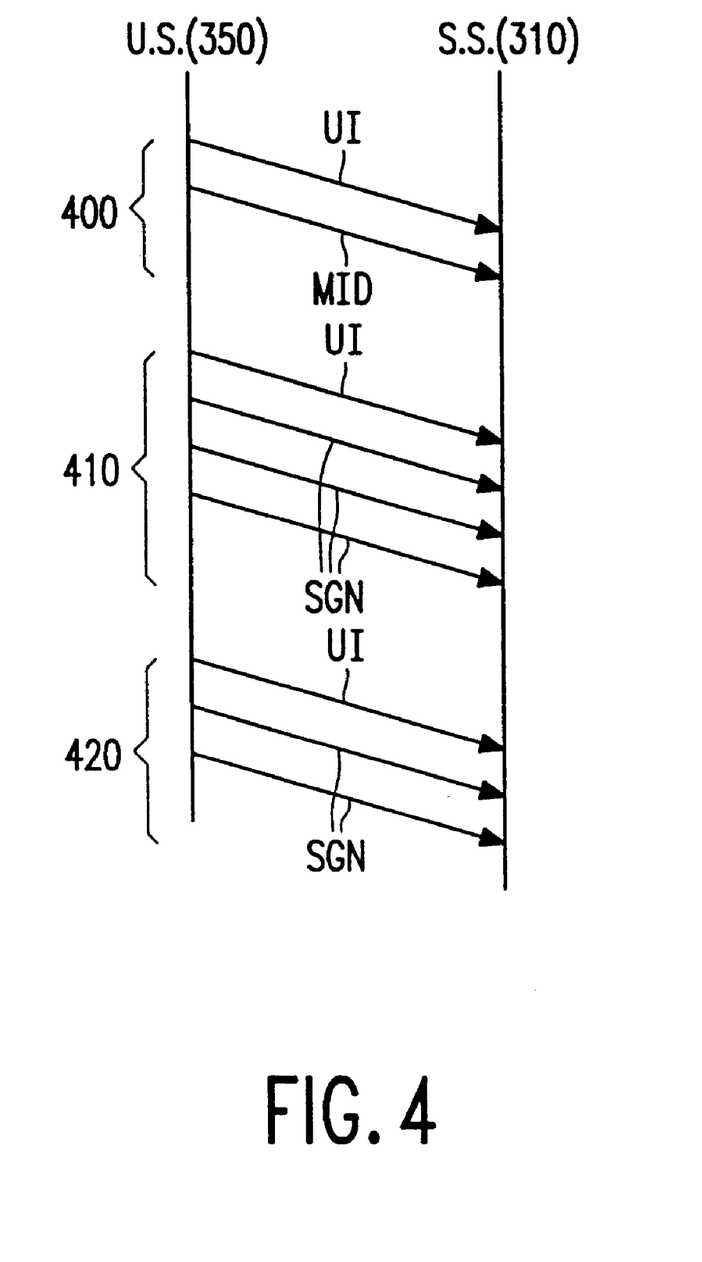
FIG. 4 shows a flow chart illustrating the enrolment phase and the recognition phase.

FIG. 4 illustrates the overall exchange of information between the user station 350 and the server station 310. In the enrolment phase 400, the user station 350 transfers the user identifier (UI) and the model improvement data (MID) to the server station 310. It will be appreciated that the exact sequence in which the items are transferred and the number of communication frames or packets which are used for transferring the items is irrelevant. During each recognition session (shown are two sessions 410 and 420), the user identifier (UI) and the signal (SGN) are transferred to the server station 310.

In a further embodiment according to the invention, the plurality of recognition models of a same type is formed by a basic recognition model and a plurality of adaptation profiles. Preferably, the basic model and the adaptation profiles are stored in a same storage, such as the storage means 314. The selection means 316 selects a recognition model by selecting at least one of the adaptation profiles in dependence on the model improvement data associated with the user of the user station. Storing means 318 are used for storing an indication of the selected adaptation profile in association with the user identifier. The retrieving means 320 retrieves a recognition model from the storage means 314 by retrieving an adaptation profile associated with the user identifier and adapting the basic recognition model under control of the adaptation profile. Techniques for adapting a recognition model are generally known. Examples of such techniques for specific recognition models are given below. The retrieving means 320 incorporates the adapted recognition model in the model collection used by the speech recognition unit 322.

In a further embodiment, the input pattern comprises speech representative data. The model improvement data comprises acoustic training data. The acoustic training data can be very limited in amount. Where in known systems approximately an hour of speech data is required to fully train an acoustic model or approximately a quarter of an hour of speech data for adapting a default acoustic model to an new user, in the system according to the invention the acoustic training data represents substantially less than a quarter of hour of speech. Preferably, the acoustic training data is limited to representing acoustic aspects of less than five minutes of speech. Advantageously, the amount of speech is limited to only a couple of sentences (e.g. less than five sentences) or even only a few words spoken by the user of the user station 350. The user may explicitly be requested to speak predetermined words or sentences (the text to be spoken may be indicated to the user). Alternatively, the training may be implicit. As an example, the recognition system could immediately become operational by using a default acoustic model. A predetermined period or amount of speech input is then used as the acoustic training data. An acoustic model suitable for the user is selected from a plurality of different acoustic models. In a preferred embodiment, the acoustic training data comprises acoustic data such as acoustic observation vectors (representing acoustic samples) and the acoustic data is separately recognized using each of the acoustic models. The acoustic model which gave the best recognition result is then selected as best matching the user. As an alternative to supplying actual acoustic data to the server station 310, the user station 350 may also extract certain acoustic characteristics, such as pitch or average speed of speaking to the server station 310. The server station 310 may store for each of the recognition models such acoustic characteristics and select a best matching model based on the characteristics. It will be appreciated that the different acoustic models may also be formed by a basic acoustic model, where adaptation profiles are used to adapt the basic acoustic model (preferably fully trained speaker independent model) into the different acoustic models. In such a case, selecting an acoustic model involves selecting an acoustic model adaptation profile. The adaptation profile may for instance by an acoustic model representing acoustic data of one or more speakers representing a specific category of speakers, such as male/female, slow/fast speaking or different accents. For the recognition the selected acoustic model adaptation profile is used to adapt the basic acoustic model. Generally known techniques for adapting an acoustic model include the Maximum Likelihood Linear Regression (MLLR) method, involving a linear transformation of the acoustic references space, and the Maximum A Posteriori (MAP) probability method or Bayesian adaptation method (refer. L. Rabiner, B-H. Juang, "Fundamentals of speech recognition", Prentice Hall 1993, pages 373 to 375). Obviously, also acoustic references of an adaptation profile may be combined with acoustic references used for training the basic acoustic model, followed by a retraining on the combined set of references.

In a further or alternative embodiment, the model improvement data comprises language model training data. The language model training data may comprise information which directly corresponds to information such as used in the language model of the speech recognition unit 322. For instance, the training data could comprise bigrams or trigrams and their respective probabilities for specific language elements used by the user. Alternatively, the training data comprises or indicates textual data (such as text files) which can be analysed by the server station. The server station 310 selects a language model from a plurality of different language models in the server station based on the language model training data associated with the user. For instance, the server station 310 selects a language model which best corresponds to an analysis of a text indicated or provided by the user. Preferably, the language model training data comprises at least one context identifier. The context identifier preferably indicates an area of interest of the user. In this case, the server station selects a language model which best matches the expressed interest. This can be done in various ways. For instance, the language model in the server station 310 may have been created for special contexts and the user may be offered the possibility of selecting between those models. Alternatively, the server station could collect textual data corresponding to the context identifier. In this case the context identifier, preferably, is a keyword or comprises or indicates a sequence of words, such as a phrase, a sentence or a document, from which the server station 310 automatically extracts one or more representative keywords. The set of documents from which the textual data is collected may be formed by a document file system, such as, for instance, used in computer systems. Using conventional documents, the selection can be performed by scanning the contents of the document. Advantageously the set of documents is formed by a document database, such as a document management system. In such a system, as an alternative to or in addition to scanning the contents of the documents, also attributes describing the contents of the documents can be used for determining whether a document is relevant. Advantageously, the set of documents is formed by documents in a distributed computer system. The distributed computer system may range from a group of local computers within one building or site of a company, connected via a local area network, to a world-wide network of computers of different companies, connected via a wide area network, such as Internet. The distributed system comprises several document stores, usually referred to as servers. The use of a distributed system and, particularly, Internet ensures that a large amount of data and usually up-to-date data is available. In this way the language model can incorporate new language elements, unknown or infrequently used at the moment the system was supplied, without the user needing to train all new elements.

Advantageously, the server station 310 itself searches a network, like Internet, for up-to-date textual data which corresponds to the context identifier. Also specialised search engines or search agents may be used for locating the textual data. Based on the textual data the server station creates a language model which matches the context identifier. This model is then also available for use by other users having the same interest.

If a search engine is used, the network search engine searches the document stores in the distributed system for documents meeting the search criterion supplied by the server station 310 (or directly by the user station 350). Typically, the network search engine regularly scans the distributed system to determine which documents are available and to extract attributes, such as keywords, from the documents. The outcome of the scan is stored in a database of the search engine. The search is then performed on the database. If a search agent is used, it is the task of the search agent to search through the stores of the distributed system. To this end, the server station 310 (or the user station 350) provides the search criterion to the search agent. The search agent autonomously searches stores in the distributed system. Whenever a document fulfilling the search criterion is located the agent may deliver this to the requesting station, for instance via regular e-mail. Various forms of search agents are known, particularly for Internet. For instance, the agent may be active only in the requesting station, where it in turn (or in parallel) accesses stores in the distributed system, which respond to queries of the agent. Alternatively, the agent may move through the distributed system, e.g. by hopping from one server to another, where the agent becomes active at the server it is 'visiting' at that moment.

It will be appreciated that instead of storing several language models in full, also a basic language model may be used, representative of the generally used language, where language model adaptation profiles are used to adapt the basic model to also cater for (specific areas of interest. Various forms of adapting a language model are known. For an N-gram model the term $P(w_j|w_{j-N+1} \ldots w_{j-1})$ can be estimated by a frequency approach:

$$P(w_j|w_{j-N+1} \ldots w_{j-1}) = F(w_{j-N+1} \ldots w_{j-1}w_j)/F(w_{j-N+1} \ldots w_{j-1})$$

in which F is the number of occurrences of the string in its argument in the giving training corpus. For the estimate to be reliable, $F(w_{j-N+1} \ldots w_{j-1}w_j)$ has to be substantial in the training corpus. To overcome the situation that the training corpus has to be prohibitively large and that $F(w_{j-N+1} \ldots w_{j-1}w_j)=0$ for many possible word strings, well-known smoothing techniques may be used. As an example, for a trigram, the smoothing can be done by interpolating trigram, bigram and unigram relative frequencies:

$$P(w_3|w_2w_1) = p_1 \cdot F(w_1w_2w_3)/F(w_1w_2) + p_2 \cdot F(w_1w_2)/F(w_1) + p_3 \cdot F(w_1)/\mathrm{Sum}(F(w_1))$$

in which the non-negative weights satisfy $p_1+p_2+p_3=1$ and $\mathrm{Sum}(F(w_1))$ is the size of the training corpus. The weights depend on the values of $F(w_1w_2)$ and $F(w_1)$ and can be obtained by applying the principle of cross-validation. In this way adaptation can be performed by interpolating the basic language model with an adaptation profile which specifies a limited number of unigrams, bigrams, and/or trigrams. Suitable other methods for adapting a language model have been described in the non-prepublished German patent applications DE 19708183.5 and DE 19708184.3 both assigned to present applicant, and in the papers "Speaker adaptation in the Philips System for Large Vocabulary Continuous Speech Recognition", E. Thelen, X. Aubert, P. Beyerlein, Proceeding ICASSP 1997, Vol.2, pp 1035–1038, and "Long Term On-line Speaker Adaptation for Large Vocabulary Dictation", E. Thelen, Proceedings ICSLP 1996, pp 2139–2142.

In a further or alternative embodiment according to the invention, the model improvement data comprises vocabulary training data. The server station 310 selects a vocabulary from a plurality of different vocabularies stored in the server station 310 (or available to the server station 310). Alternatively, the server station 310 may select a vocabulary adaptation profile and using the selected vocabulary adaptation profile to adapt a basic vocabulary. The vocabulary adaptation profile may for instance comprise or indicate a list of additional words, which are simply added to the basic vocabulary, which may cover the words normally used in a language. It will be appreciated that adding a new word to a vocabulary may, in itself, not be sufficient to ensure that the word can be recognized. For a speech recognition system a transcription in acoustic references is additionally required. For many languages, a reasonably accurate transcription can be achieved automatically for most words. By comparing a new word to words already in the vocabulary and having a transcription, a suitable transcription can be created. For instance, with a reasonably high accuracy a phonetic transcription can be made for a word based on phonetic transcriptions of known words. Even if the transcription is of only moderate quality, the new word will be present in the vocabulary and, preferably, also in the language model. This allows recognition of the word (which otherwise would not be possible) and, with the assistance of the language model, the recognition of the word may be of an acceptable level in its context. Once the word has been recognized, the transcription can automatically be adapted to better match the actual utterance for which the word is recognized.

In a further embodiment, the vocabulary training data comprises at least one context identifier and the server station 310 is operative to select a vocabulary or a vocabulary adaptation profile corresponding to the context identifier. Similar to as described for the language model, the server station 310 is operative to locate text in dependence on the context identifier. From the located text, the server station 310 extracts words. Various techniques are known for extracting words, such as keywords, from a text. For speech recognition, the server station 310 may use a separate "phonetic" dictionary to transcribe the words to an acoustic representation. Alternatively, this is performed automatically as indicated before.

What is claimed is:

1. A method for recognizing an input pattern stored in a user station using a recognition unit of a server station; the server station and the user station being connected via a network; the recognition unit being operative to recognize the input pattern using a model collection of at least one recognition model; the method comprising:

performing an initial recognition enrolment step, comprising transferring model improvement data associated with a user of the user station from the user station to the recognition unit; and associating the user of the user station with a user identifier; and for a recognition session between the user station and the server station, transferring a user identifier associated with a user of the user station and an input pattern representative of time sequential input generated by the user from the user station to the server station; and using the recognition unit to recognize the input pattern by incorporating at least one recognition model in the model collection which reflects the model improvement data associated with the user; characterized:

in that the server comprises a plurality of different user-oriented recognition model sets, each set of a same type;

in that the recognition enrolment step comprises selecting a user-oriented recognition model from a set of a same type in dependence on the model improvement data associated with the user; and storing an indication of the selected user-oriented recognition model in association with the user identifier; and in that the step of recognizing the input pattern comprises retrieving a user-oriented recognition model associated with the user identifier transferred to the server station and incorporating the retrieved user-oriented recognition model in the model collection.

2. A method as claimed in claim 1, characterized:

in that the plurality of user-oriented recognition models of a same type is formed by a basic recognition model and a plurality of adaptation profiles;

in that the step of selecting a user-oriented recognition model in dependence on the model improvement data associated with the user comprises selecting at least one of the adaptation profiles in dependence on the model improvement data; and in that the recognition enrolment step comprises storing an indication of the selected adaptation profile in association with the user identifier; and in that the step of retrieving a user-oriented recognition model associated with the user identifier comprises retrieving an adaptation profile associated with the user identifier and adapting the basic recognition model under control of the adaptation profile.

3. A method as claimed in claim 1, characterized in that the input pattern comprises speech representative data; in that the model improvement data comprises acoustic training data and that selecting a recognition model from the plurality of different user-oriented recognition models comprises, based on the acoustic training data associated with the user, selecting an acoustic model from a plurality of different acoustic models or selecting an acoustic model adaptation profile and using the selected acoustic model adaptation profile to adapt a basic acoustic model.

4. A method as claimed in claim 3, characterized in that the acoustic model adaptation profile comprises a matrix for transforming an acoustic references space; or a set of acoustic references to be combined with acoustic references used by the basic acoustic model.

5. A method as claimed in claim 1, characterized in that the model improvement data comprises language model training data and that selecting a user-oriented recognition model from the plurality of different user-oriented recognition models comprises, based on the language model training data associated with the user, selecting a language model from a plurality of different language models or selecting a language model adaptation profile and using the selected language model adaptation profile to adapt a basic language model.

6. A method as claimed in claim 5, characterized the language model training data comprises at least one context identifier; and in that the method comprises the step of in the server station selecting a language model or a language model adaptation profile corresponding to the context identifier.

7. A method as claimed in claim 1, characterized in that the model improvement data comprises vocabulary training data and that selecting a recognition model from the plurality of different user-oriented recognition models comprises, based on the vocabulary training data associated with the user, selecting a vocabulary from a plurality of different vocabularies or selecting a vocabulary adaptation profile and using the selected vocabulary adaptation profile to adapt a basic vocabulary.

8. A method as claimed in claim 7, characterized in that the vocabulary training data comprises at least one context identifier; and in that the method comprises the step of in the server station selecting a vocabulary or a vocabulary adaptation profile corresponding to the context identifier.

9. A method as claimed in claim 6, characterized in that the context identifier comprises a keyword.

10. A method as claimed in claim 9, characterized in that the context identifier comprises or indicates a sequence of words, and in that the method comprises extracting at least one keyword from the sequence of words and performing the selection based on the extracted keyword(s).

11. A pattern recognition system comprising at least one user station storing an input pattern and a server station comprising a recognition unit; the recognition unit being operative to recognize the input pattern using a model collection of at least one recognition model; the server station being connected to the user station via a network;

the user station comprising means for:

initially transferring model improvement data associated with a user of the user station and a user identifier associated with the user to the server station; and for each recognition session between the user station and the server station transferring a user identifier associated with a user of the user station and an input pattern representative of time sequential input generated by the user to the server station; and the server station comprising means for, for each recognition session between the user station and the server station, incorporating at least one recognition model in the model collection which reflects the model improvement data associated with a user from which the input pattern originated; and using the speech recognition unit to recognize the input pattern received from the user station;

characterized in that the server station comprises:

a plurality of different user-oriented recognition model sets, each set of a same type;

means for selecting a user-oriented recognition model from a a set of a same type in dependence on the model improvement data associated with the user identifier; and means for retrieving a user-oriented recognition model associated with the user identifier transferred to the server station and for incorporating the retrieved user-oriented recognition model in the model collection.

\* \* \* \* \*